United States Patent [19]
Fridrich

[11] Patent Number: 6,064,738
[45] Date of Patent: May 16, 2000

[54] METHOD FOR ENCRYPTING AND DECRYPTING DATA USING CHAOTIC MAPS

[75] Inventor: Jiri Fridrich, Johnson City, N.Y.

[73] Assignee: The Research Foundation of State University of New York, Albany, N.Y.

[21] Appl. No.: 08/763,572

[22] Filed: Dec. 10, 1996

[51] Int. Cl.[7] ............................... H04L 9/18; H04L 9/34; H04K 1/06

[52] U.S. Cl. ............................. 380/28; 380/37; 380/44; 380/243

[58] Field of Search ............................... 380/28, 37, 18, 380/42, 43

[56] References Cited

U.S. PATENT DOCUMENTS

| | | | |
|---|---|---|---|
| 4,232,194 | 11/1980 | Adams | 179/1.5 R |
| 5,001,754 | 3/1991 | Deffeyes | 380/46 |
| 5,365,589 | 11/1994 | Gutowitz | 380/43 |
| 5,479,513 | 12/1995 | Protopopescu et al. | 380/28 |
| 5,533,127 | 7/1996 | Luther | 380/28 |
| 5,696,826 | 12/1997 | Gao | 380/28 |
| 5,870,470 | 2/1999 | Johnson et al. | 380/6 |

OTHER PUBLICATIONS

Schneier, B., "Applied Cryptography," 2nd Ed., John Wiley & Sons, pp. 193–197, Oct. 1995.

*Primary Examiner*—James P. Trammell
*Assistant Examiner*—Justin T. Darrow
*Attorney, Agent, or Firm*—Salzman & Levy

[57] ABSTRACT

The present invention features a method for encrypting and decrypting large amounts of data such as images. A simple two-dimensional map is first generalized by the introduction of parameters. The generalized map is then discretized so that it maps a rectangular matrix of points (pixels in the case of image data) in a bijective manner. Finally, the map is extended to three dimensions to modify the gray levels. The parameters of the map then serve as a ciphering key. The encryption consists of several iterative applications of the map to a block of a plain text message such as an image. The encryption is such that the resultant image is uncorrelated and appears as static on a TV monitor in the absence of a signal. The resultant histogram of the enciphered image becomes essentially uniform. The enciphered data is deciphered by applying an inverse map an identical number of iterations. The inventive method provides both superior speed and improved security over previously used methods of encryption.

4 Claims, 14 Drawing Sheets

METHOD FOR ENCRYPTING AND DECRYPTING DATA USING CHAOTIC MAPS

This invention was made with Government support under contract F30602-96-1-0047 to Department of the Air Force, Rome Laboratory/ERT, Attention: Richard Simard, 525 Brooks Road, Rome, N.Y. 13441-4505; and the Government has certain rights in this invention.

FIELD OF THE INVENTION

The present invention relates to the field of data cryptography and more specifically to a system of block type cryptography utilizing a private key. The encryption/decryption method of the invention is based on two-dimensional and three-dimensional chaotic maps. The inventive system is particularly appropriate for encryption of large data files, such as digitized images.

BACKGROUND OF THE INVENTION

The need for cryptography dates to the earliest use of written language. The need to keep messages private gave rise to the science of cryptography. Ciphers were used for safeguarding military secrets in Roman times. Over the years, cryptography has become more and more sophisticated. Today a vast amount of information is being transmitted digitally for both military and commercial purposes. Prudence dictates that much of this information be kept private.

At least some transmitted data exists in the form of binary data files. A binary data file is generally distinguished from a text file in that each byte of data can represent many more combinations than the usual 128 characters of text associated with the ASCII or similar character set. A digitized image, for example, is normally in the form of a binary file. Technically speaking, all eight bits in a byte are used in a binary file. Consequently, 256 ($2^8$) different binary patterns may be encoded. In text, however, normally only seven of eight possible bits are employed, resulting in the 128 ($2^7$) possible characters.

Practical transmission of large, binary data files requires fast and robust encryption techniques. Current software implementations of the most popular encryption methods or algorithms, such as Rivest, Shamir, Adleman (RSA), El Gamal, or Data Encryption Standard (DES), do not provide encryption rates suitable for use with large data files, such as images.

Moreover, the security of most public key cryptographic schemes, such as RSA, or El Gamal, is based on the difficulty of performing factorization of large numbers, or in solving discrete logarithm problems in a fast, efficient manner. Recent advances in algorithmic techniques, number theory, and distributed computing, not to mention the availability of powerful but inexpensive personal computers, have seriously challenged the basis of these techniques. In addition to that, the newly emerged field of quantum computing could, theoretically, make those methods totally unusable in the future. Also, the need for alternative, secure and fast encryption techniques for transfer and archival of large amounts of data increases quickly with the growing access to and use of the Internet.

A new class of encryption techniques based on two- and three-dimensional chaotic maps is described in the present invention. Chaotic maps, representative of images or data, provide excellent security and have other desired cryptographic qualities. For example, both the hardware and software necessary to implement the techniques of the present invention are simple. This simplicity results in high efficiency which, in turn, produces high encryption rates.

Two desirable cryptographic properties of chaotic maps are sensitivity to initial conditions and parameters, and mixing (topological transitivity). Sensitivity to initial conditions means that when a chaotic map is iteratively applied to two initially close points of data in an array, the points quickly diverge, and eventually become uncorrelated. Sensitivity to parameters causes the properties of the map to change quickly when the parameters on which the map depends are slightly perturbed.

Mixing, or topological sensitivity, is the tendency of the system to quickly "scramble up" small portions of the state space into an intricate network of filaments. Local, correlated information becomes scattered all over the state space.

All of these properties suggest that chaotic maps constrained to a discrete, two-dimensional lattice could be used to generate complicated transformations of data, such as pixels including gray levels of a digital image. Indeed, it is possible to modify certain invertible two-dimensional maps on a torus or on a rectangle for the purpose of image encryption.

SUMMARY OF THE INVENTION

The present invention is a private key encryption system based on iterative applications of two- and three-dimensional chaotic maps to a rectangular array of data, such as a digital image. The inventive encryption system provides a high level of security for transmission of data over public channels and for data archiving.

The process of creating a cipher starts with discretizing a two-dimensional chaotic map so that it maps a rectangular lattice of points onto itself in a one-to-one manner. For purposes of this disclosure, a two-dimensional baker map, well known in the art, has been chosen. The map is extended to three dimensions in order to further modify (a) values of data items, such as the gray levels in a digitized image, and (b) the positions of the data items in the array. Further modification of the gray level mixing function allows achieving a balance between error robustness and security. The parameters of the map play the role of the ciphering key. The encryption consists of several iterative applications of the chaotic map to a digital image. Even though chaotic maps are usually very simple, after several iterations a complex permutation of pixels is usually generated. This is a direct consequence of mixing and sensitivity to initial conditions. The size of the enciphered image is equal to the size of the original image.

The deciphering phase consists of several applications of the inverse of the original chaotic map. Since a simple analytic form is available for both the map and its inverse, the enciphering/deciphering phases take approximately the same amount of time and can be carried out quickly. The general properties of chaotic maps guarantee: (a) cipher security, (b) very large number of ciphering keys, (c) easy parallelization, and (d) simple and fast implementation.

The cipher of the present invention has been shown to be secure with respect to known plain text types of attack. Breaking the cipher by direct search for key is equivalent to performing a great number of high-level pattern recognition and image understanding tasks. One of the advantages of chaos-based image cryptography is the fact that spatially localized information in the original image becomes non-local and uncorrelated in the encrypted image.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

The encryption/decryption methods of the instant invention are particularly useful when large amounts of data must be securely transmitted or archived. The secure transmission of images is one application for which the inventive techniques are suited.

Figure 1:
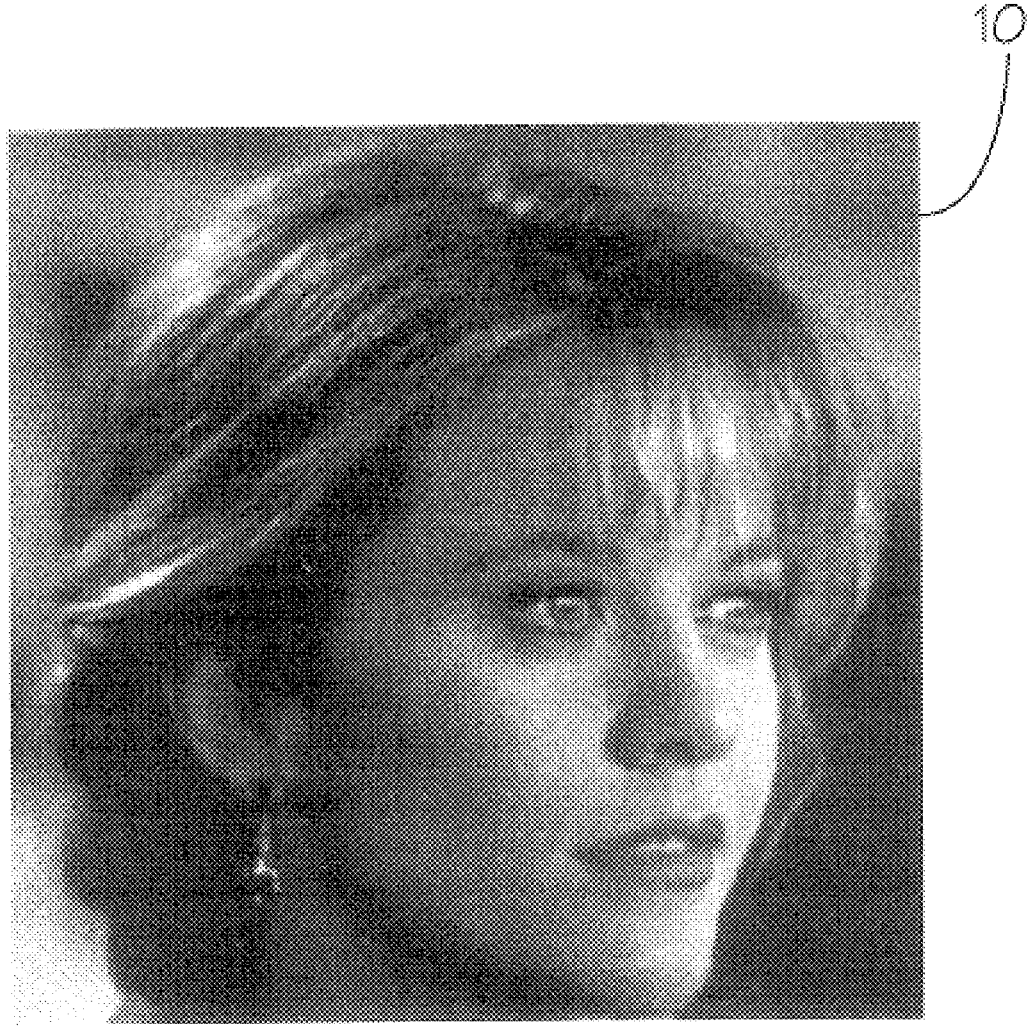
FIG. 1 is a typical photographic image.

Referring now to FIG. 1, there is shown a typical monochromatic image 10. For purposes of this disclosure, a square image has been chosen. Any image is composed of discreet areas called picture elements or pixels. Image 10 is composed of a 472×472 array of pixels. Associated with each pixel is a degree of intensity (i.e., lightness or darkness). In a monochrome image this is quantified as a discreet number on a gray scale. Typical gray scale ranges are: 0–16, 0–64, and 0–256. Even larger ranges are often used.

Figure 2:
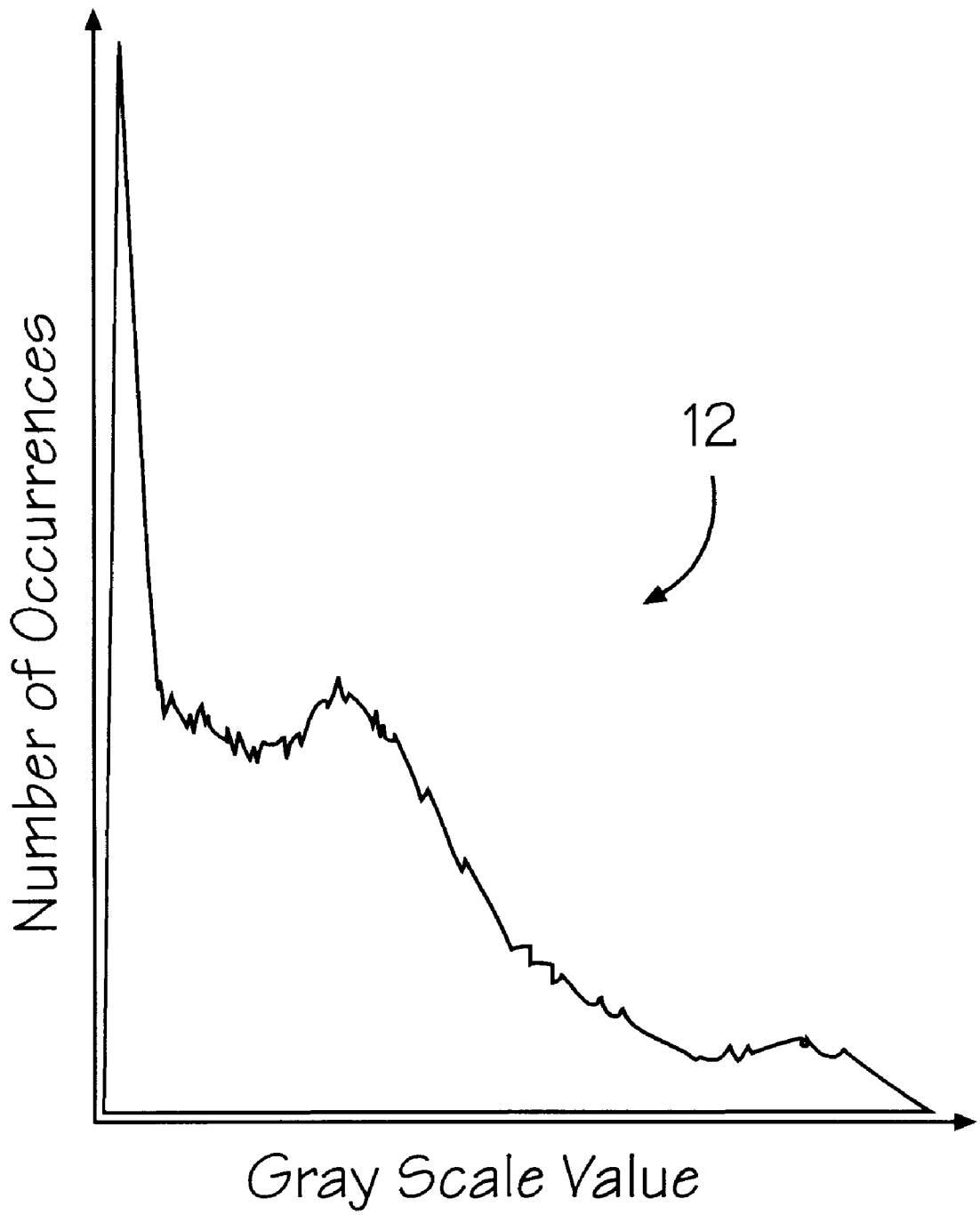
FIG. 2 is a histogram of the gray scale values of the pixels in the image shown in FIG. 1.

FIG. 2 shows a histogram 12 of the gray value of each pixel in image 10 (FIG. 1). Low gray scale numbers refer to the darkest areas of the image 10 while higher gray scale numbers are associated with the lighter areas of image 10. If each pixel of image 10 were to be moved to another location in the image, the resultant image would probably bear little resemblance to original image 10; but the histogram of pixel gray scale values in the resultant image would be unaffected by repositioning the pixels. In fact, repositioning of pixels could be repeated any number of times and the histogram of the final image (not shown) would be identical to the histogram of the original image. In order for the histogram of gray scale values to be affected, the gray scale values associated with the pixels would also have to be changed.

Figure 3:
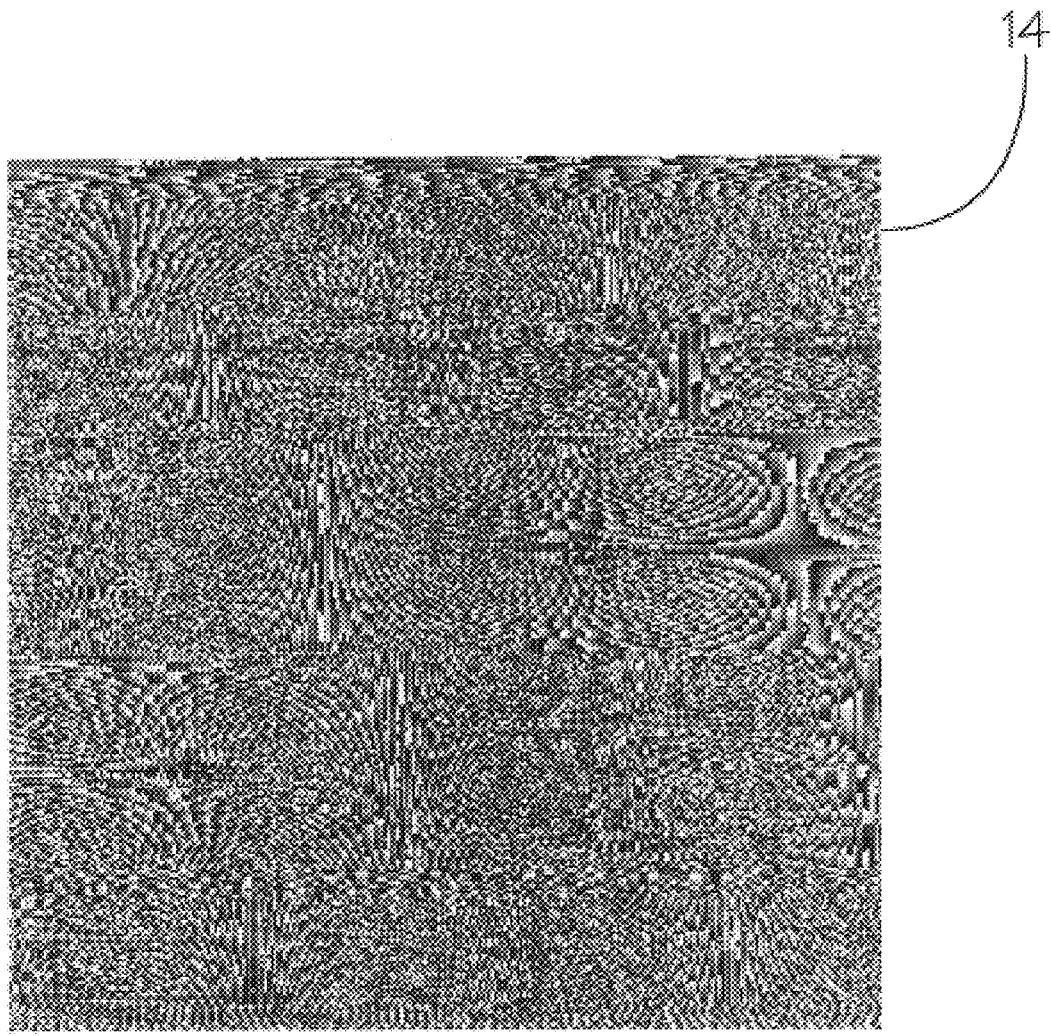
FIG. 3 is a resultant image after a single application of the method of the invention to the image shown in FIG. 1.

FIG. 3 shows a resultant image 14 after pixel repositioning and gray level modifications of image 10 (FIG. 1). Examination of image 14 reveals certain patterns, although none of the patterns seems to suggest original image 10.

Figure 4:
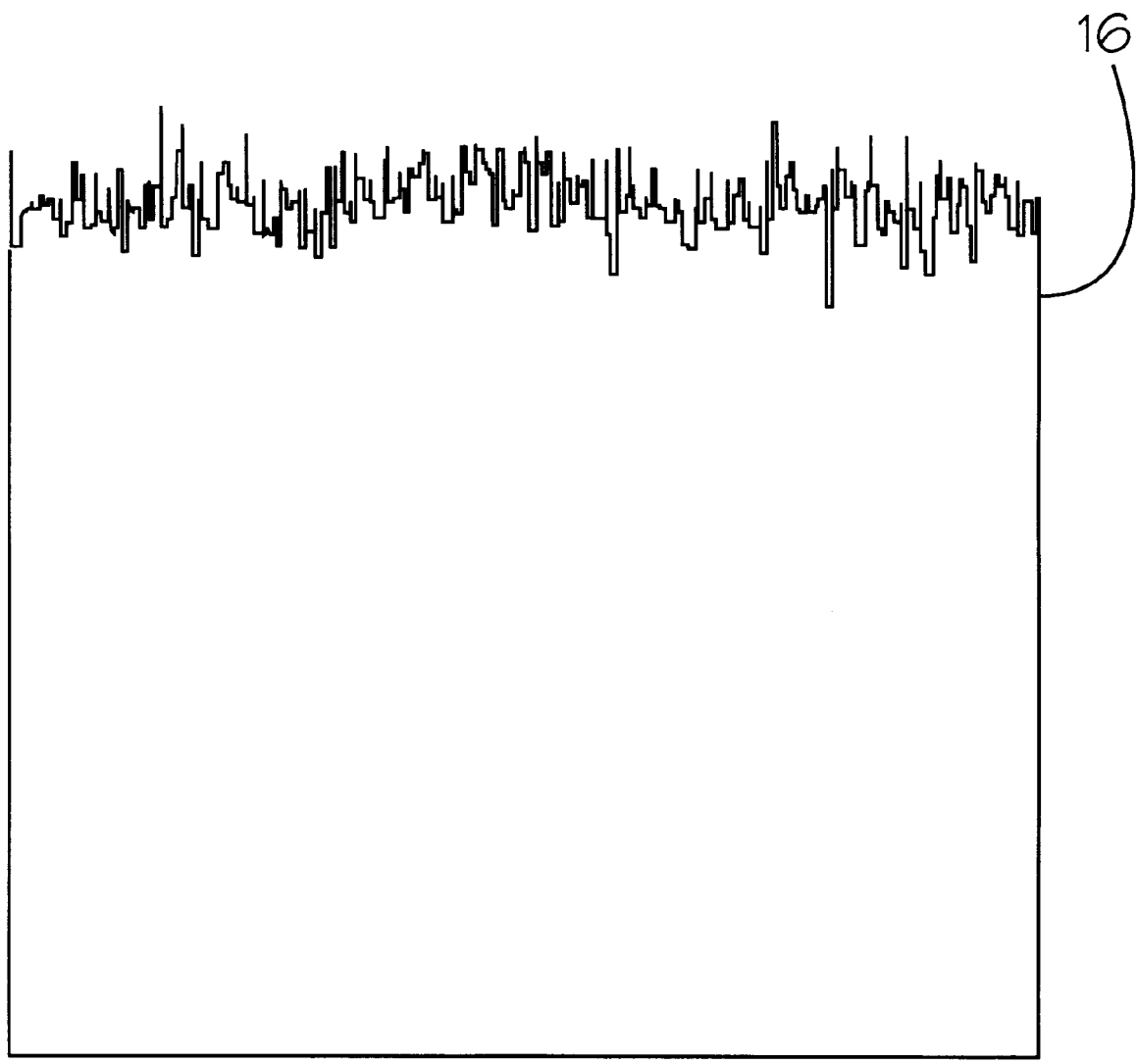
FIG. 4 is a histogram of the gray scale values of the pixels in the image shown in FIG. 3.
Figure 5:
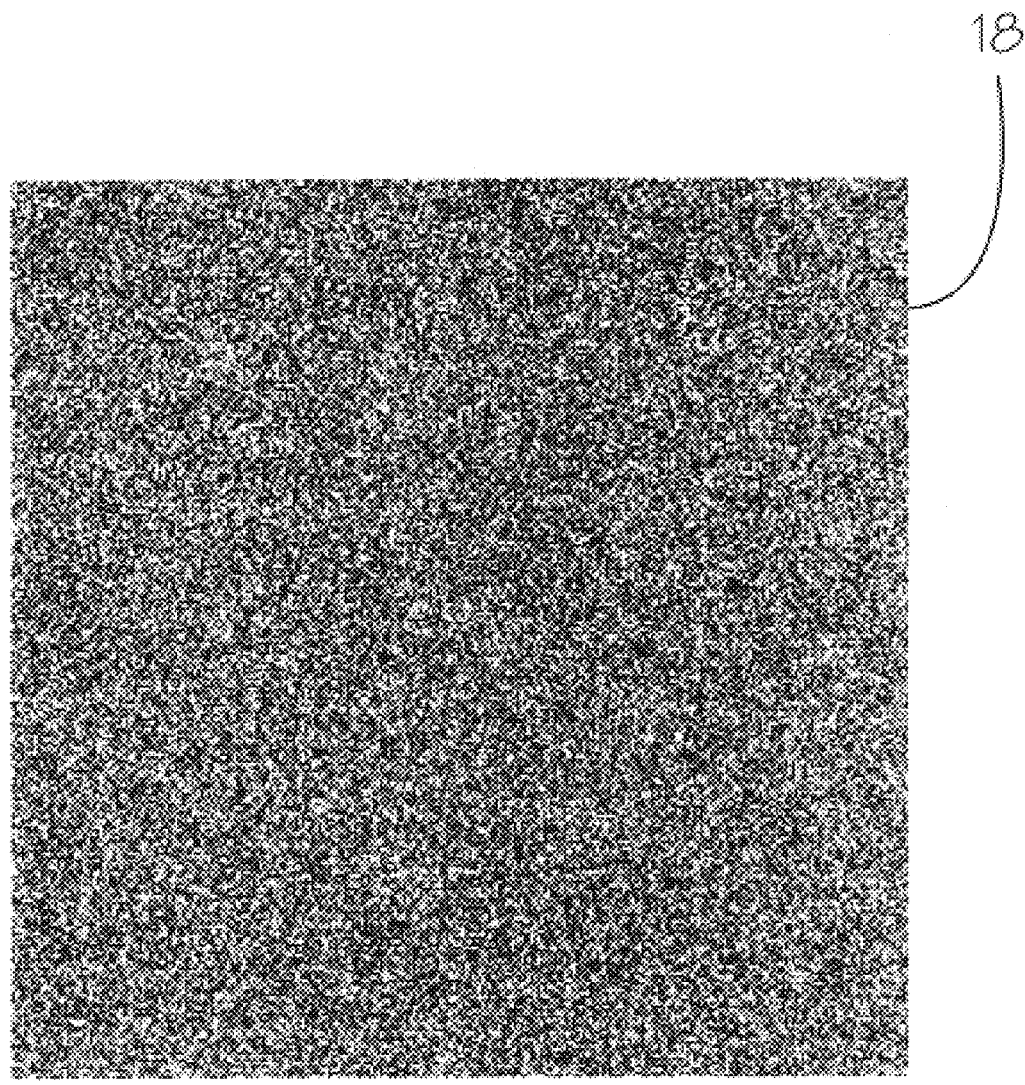
FIG. 5 is a resultant image after nine iterations of the method of the invention to the image shown in FIG. 1.

FIG. 4 shows a histogram 16 of the gray scale values of image 14 (FIG. 3). Comparing histogram 16 with histogram 12, a marked difference is readily discerned. While histogram 12 has an irregular distribution, histogram 16 is quite regular. If the repositioning process is repeated nine times, image 18, shown in FIG. 5, is obtained. Essentially no pattern may be discerned in image 18.

Figure 6:
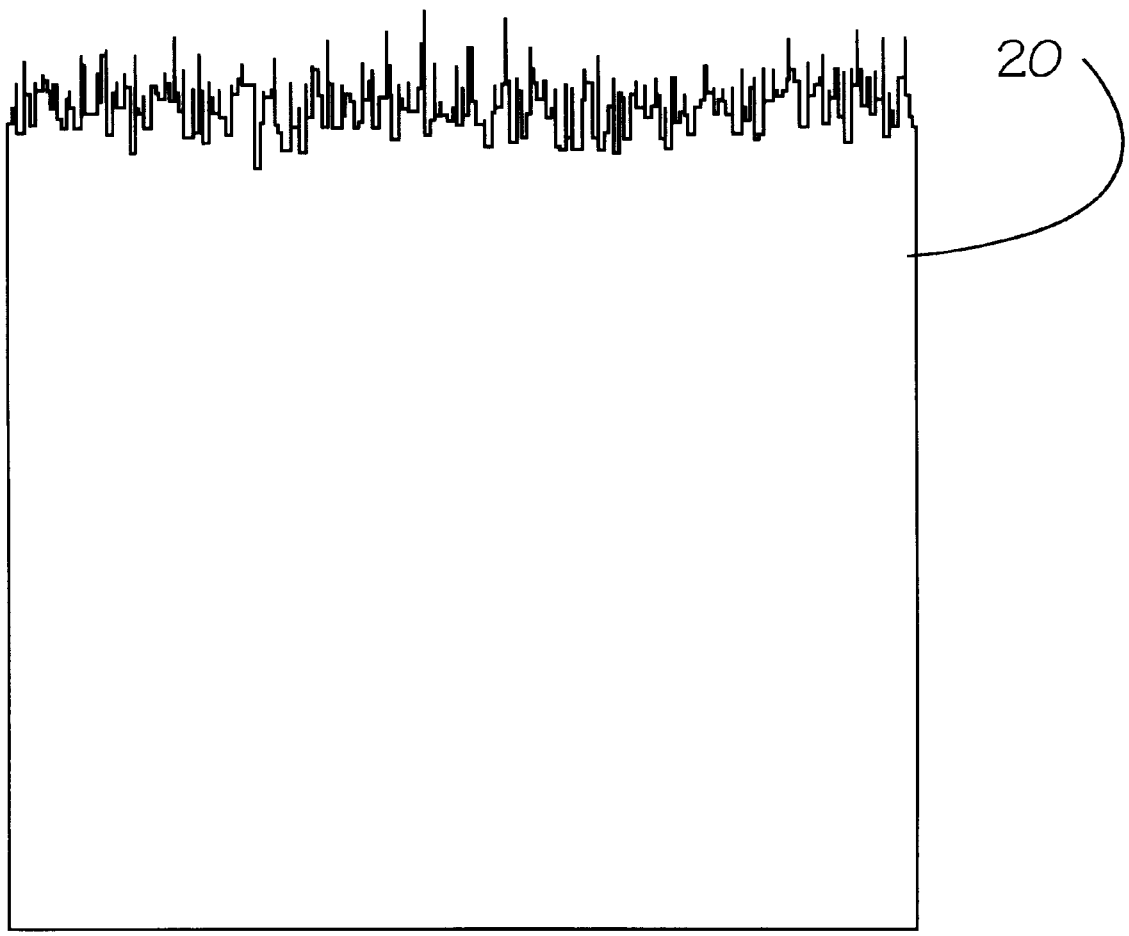
FIG. 6 is a histogram of the gray scale values of the pixels in the image shown in FIG. 5.

FIG. 6 shows the histogram 20 corresponding to image 18. While images 14 and 18 exhibit discernable differences, their corresponding histograms 16 and 20 exhibit very little difference. Image 18 would generally be considered a random image (i.e., there is no evident pattern and there is essentially an equal probability of any gray scale value). This introduction forms the basis of the inventive encryption/decryption method of the present invention.

Figure 7:
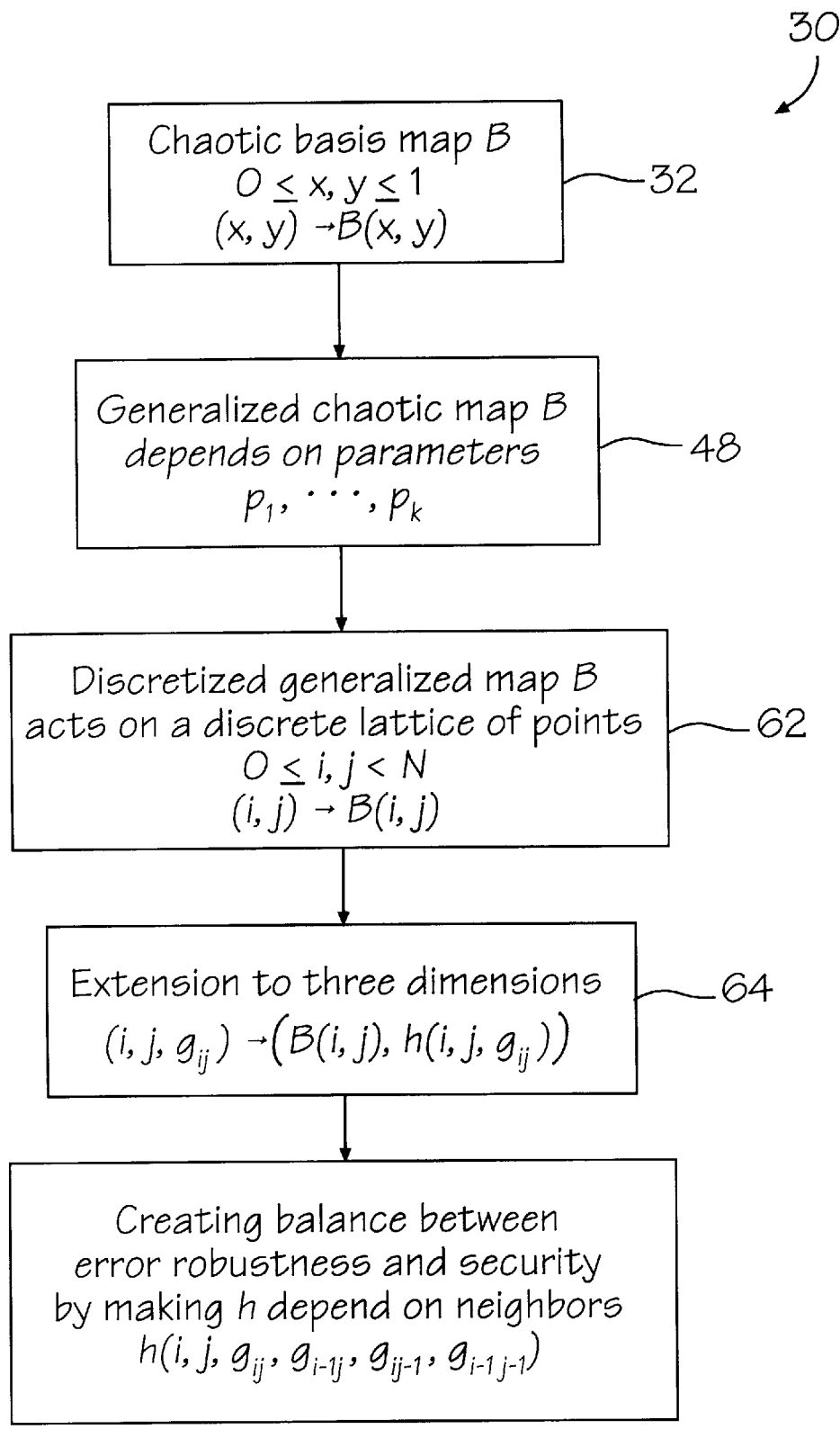
FIG. 7 is a flowchart showing the process of creating a chaos-based image encryption method in accordance with the present invention.

Referring first to FIG. 7, a flow chart 30 shows the five steps of the present invention for creating the cipher. First, step 32, the mathematical form of a chaotic two-dimensional map is chosen to map the unit square I×I (where I=[0, 1]) onto itself in a one-to-one manner. There are a number of different chaotic maps which seem to be suitable for ciphering purposes. Maps which are simple, allowing the ciphering/deciphering phases to be performed quickly, are the most desirable. The map chosen should allow natural parametrization to create a short ciphering key with a large number of possible key values. Such maps are often described geometrically, which means that the mechanism of the map can be described in plain English using simple geometrical objects such as rectangles, triangles, parallelograms, etc. In the present invention, the well known baker map has been used since it has been shown to provide a high degree of security compared to other simple chaotic maps, such as the cat map. (For a description of the cat map, see "Chaos in Dynamical Systems" by Edward Ott, Cambridge University Press, New York, 1993.)

Figure 8:
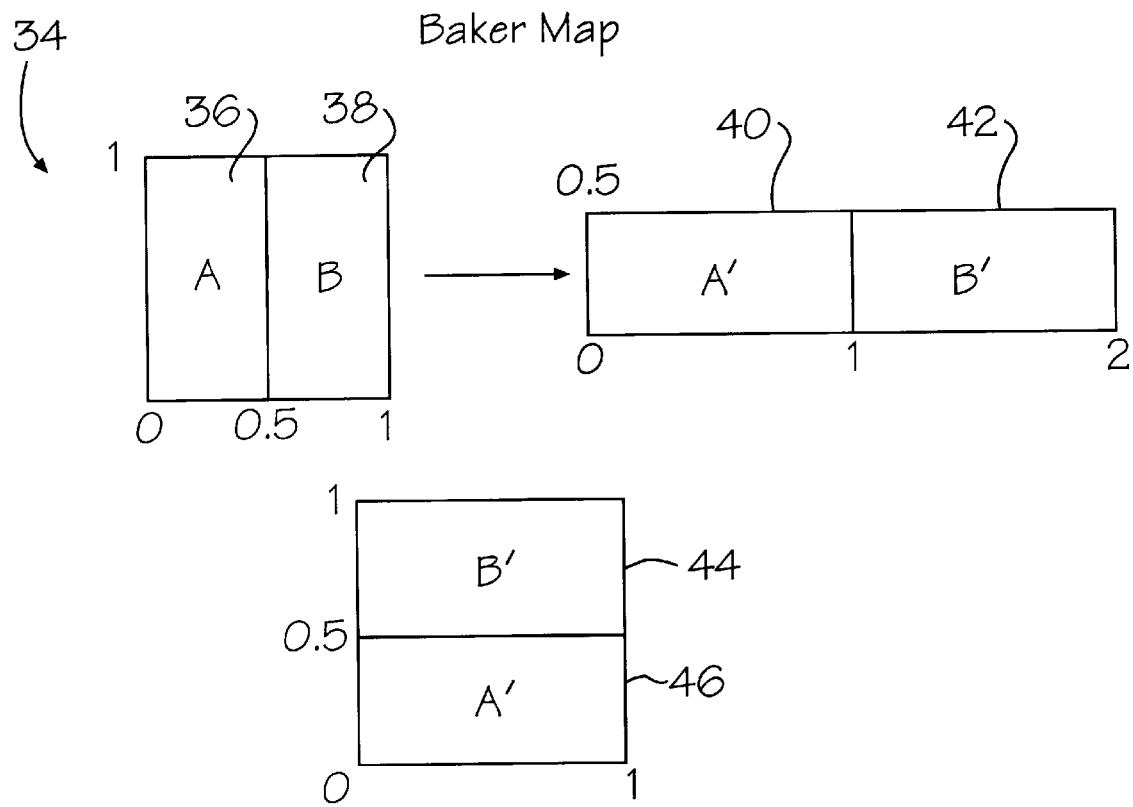
FIG. 8 shows the geometric form of a two-dimensional baker map.

Referring now also to FIG. 8, a schematic representation of a baker map is shown generally at reference number 34.

The baker map portion B is described with the following formula:

$$B(x,y)=(2x, y/2)$$

when $0 \leq x < \frac{1}{2}$, and $$B(x,y)=(2x-1, y/2+\frac{1}{2})$$

when $\frac{1}{2} \leq x \leq 1$.

The map acts on a unit square (i.e., both the vertical and horizontal dimensions are unity) as depicted at reference number 34. The left vertical column A [0, ½)×[0, 1), shown as reference number 36, is stretched horizontally and contracted vertically into rectangle A' [0, 1)×[0, ½), shown as reference number 40. Likewise, the right vertical column B [½, 1)×[0, 1), shown as reference number 38, is mapped (contracted vertically and stretched horizontally) into rectangle B' [0, 1)×[½, 1), shown as reference number 42. Rectangle B' is then severed from and disposed on rectangle A', as shown as reference numbers 44 and 46, respectively. The baker map is a chaotic bisection of the unit square I×I onto itself.

Referring still to FIG. 7, a set of parameters (integers) is introduced into the map to create a ciphering key, step 48. If the basic map is described in geometric terms, the parametrization is usually straightforward. If parametrization can be performed in several different ways, the method which best suits the purpose of secure ciphering must be chosen. There are infinitely many possible schemes for parametrization. One different possibility would be to consider one iteration of the parametrized baker map as a composition of several subiterations, $B(E)=B_{p1}(E)_o \ldots {}_oB_{pk}(E)$, where E is the unit square, "$_o$" means composition of maps, and $p_1, \ldots, p_k$ are parameters (numbers between 0 and 1). Each $B_{pi}$ map works by splitting the unit square into two vertical rectangles of widths $p_i$ and $1-p_i$. Each rectangle is contracted and stretched by a factor $1/p_i$ and $1/(1-p_i)$, respectively, then cut and re-assembled in a manner similar to the baker map, so that a square is obtained.

Figure 9:
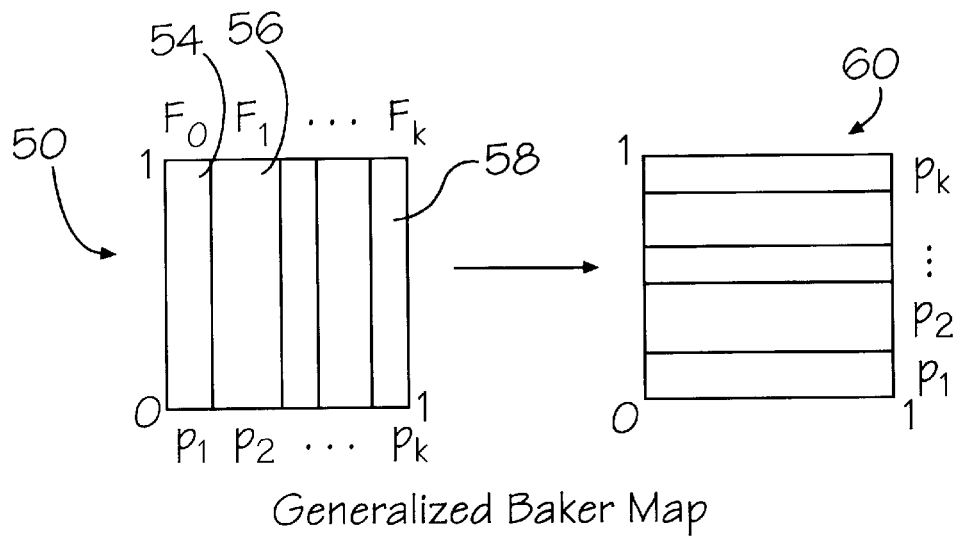
FIG. 9 shows the geometric form of the generalized baker map.
Figure 10:
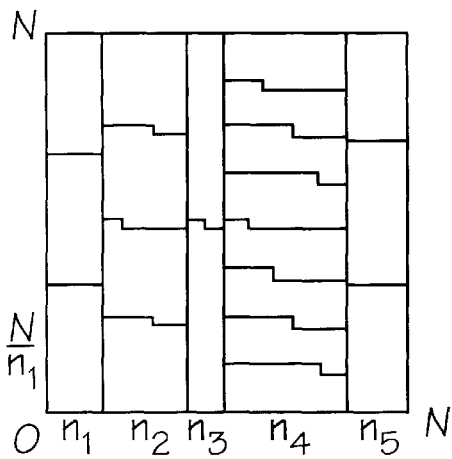
FIG. 10 shows the discretization of the image for the discretized generalized baker map.

Referring now also to FIG. 9, instead of dividing the square baker map 50 into two rectangles of the same size, as described hereinabove, an original square 50 is divided into k vertical rectangles 54, 56 and 58, $[F_{i-1}, F_i)\times[0, 1)$, $i=1, \ldots, k$, $F_i=p_i+\ldots+p_{i-1}$, such that $p_1+\ldots+p_k=1$. The lower left corner of the i-th rectangle is located at $F_i=p_i+\ldots+p_{i-1}$. The generalized baker map stretches each rectangle horizontally by the factor, $1/p_i$. The rectangle is also contracted vertically by the factor, $p_i$. Finally, all rectangles are stacked on top of each other as shown generally at reference number 60. This process may be described formally by the following equation:

$$B(x, y) = \left(\frac{1}{p_i}(x - F_i), p_i y + F_i\right) \text{ for } (x, y) \in [F_i, F_i + p_i) \times [0, 1),$$

It is convenient to denote the baker map and its generalized version as $B_{(½, ½)}$ and $B_{(p1, \ldots, pk)}$, respectively. The generalized map inherits all important properties of the baker map, such as sensitivity to initial conditions and parameters, mixing, and invertibility.

The generalized map is then modified, step 62, to account for the fact that an image is a finite lattice of pixels. The domain and range of the map is changed from the unit square I×I to the lattice $N^N_0 \times N^N_0$, where $N^N_0=\{0, \ldots, N-1\}$ with N equal to the number of pixels in one row. The discretized map F assigns each pixel to some other pixel in a bijective manner (e.g., the discretized version is a permutation of pixels). The discretization must satisfy the following asymptotic property.

$$\lim_{N\to\infty} \max_{0\leq i,j<N} |f(i/N, j/N) - F(i,j)| = 0,$$

where f is the continuous basic map and F is the discretized version. The formula requires the discretized map to become increasingly closer to the continuous map as the number of pixels tends to infinity.

The discretized generalized baker map is denoted $B_{(n1, \ldots, nk)}$, where the sequence of k integers, $n_1, \ldots, n_k$, is chosen such that each integer $n_i$ is greater than or equal to zero, and $n_1+\ldots+n_k=N$. The image is divided into k vertical rectangles $n_i \times N$, $i=1, \ldots, k$. Each rectangle is divided into $n_i$ boxes containing exactly N points. These boxes do not necessarily have to have a rectangular shape unless $n_i$ is a divisor of N (see FIG. 7). The top and bottom row of each box may exhibit a one-pixel "step". Following the action of the generalized baker map, the pixels from each block are mapped in a column-by-column manner to one row of N pixels. The procedure is illustrated for N=16, $n_i=6$:

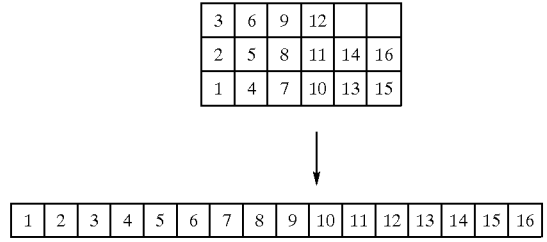

If all of the parameters $n_i$ are divisors of N, a simple mathematical formula describes the mapping:

$$B_{(n_1, \ldots, n_k)}(r, s) = \left(\frac{N}{n_i}(r - N_i) + s \bmod \frac{N}{n_i}, \frac{n_i}{N}\left(s - s \bmod \frac{N}{n_i}\right) + N_i\right),$$

where $N_i=n_1+\ldots+n_{i-1}$, and $N_i \leq r < N_i+n_i$, and $0<s<N$. It can be shown that the action of the discretized map defined by this formula can be represented by Bernoulli shifts in finite abelian groups (F. Pichler and J. Scharinger, "Ciphering by Bernoulli Shifts in Finite Abelian Groups", *Contributions to General Algebra* (Proceedings of the Linz-Conference), Jun. 2–5, 1994). This representation enables an elegant description of the dynamic in a symbolic form.

Two-dimensional chaotic maps may be characterized by a sequence of integers, as is described in detail hereinbelow. These integers provide one of the required parameters for key generation. Another parameter is the number of applications (iterations) of the chaotic map to the data to be encrypted, typically an integer less than 30.

Since images may be rectangular rather than square, it is important to extend the cipher to rectangular lattices of points. The geometrical construction of the generalized baker map can be readily extended to a rectangle without any modifications. The only problem is with the discretized version of the map. For an M×N image with M≠N, the number of pixels in each vertical rectangle, $n_i$ N, may not be a multiple of M. In order to keep the number of pixels in each vertical rectangle at some multiple of M, the rectangles must be modified and a unit step must be allowed in the vertical sides of some of the rectangles. Consequently, some boxes may have a unit step in pixels not only at the top or the bottom, but also at the sides. Of course, when $n_i$ N is divisible by M, there will be no steps in the vertical sides of the rectangle. This slight modification of the baker map preserves the geometric characteristics of the original, continuous baker map and is consistent with the requirements stated above.

Next, the map is extended to three dimensions, step 64. The application of discretized chaotic maps creates a permutation of pixels. This means that the histogram of the gray levels of an image does not change, which could serve as a potential clue for an eavesdropper. The security of chaos-based ciphering can be significantly improved when the pixels in a digital image are permuted and their gray levels are simultaneously changed. This is the purpose of the extension of the map to three dimensions.

A general extension procedure can be described in which any one-to-one two-dimensional mapping can be modified to a three-dimensional mapping that acts both on the pixels and on their gray levels. Since the new gray levels depend on pixel positions, a better, safer cipher is thus obtained. The scrambling of pixels and their gray levels using the three-dimensional map is very effective—only two applications of the map to an image consisting of a solid black square produces an encrypted image with a uniform histogram, i.e. with a uniform distribution of gray levels.

Let B be any discretized two-dimensional chaotic map. Let $g_{ij}$ denote the gray level of the pixel (i,j), $g_{ij} \in \{0, \ldots L-1\} = N^L_0$. We need to find a map $$h: N^M_0 \times N^N_0 \times N^L_0 \rightarrow N^L_0$$

such that the pixel (i, j) with gray level $g_{ij}$ is mapped to B(i, j) with a gray level $h(i, j, g_{ij})$. The three-dimensional map $$B3: N^M_0 \times N^N_0 \times N^L_0 \rightarrow N^M_0 \times N^N_0 \times N^L_0$$

should be invertible to make deciphering possible. This means that $B3(i, j, g') \neq B3(i, j, g'')$ for each $(i, j) \in N^M_0 \times N^N_0$ and $g', g'' \in N^L_0$. This is possible if and only if h is one-to-one for each i, j. This requirement is not restrictive at all and enables us to construct a large variety of gray level permutations. For example, $$h(i,j,g_{ij}) = g_{ij} + h'(i,j) \mod L,$$

where h' is any (possibly not one-to-one) function of i and j, produces an acceptable map h. In this case, h can be interpreted as a simple shift cipher with the shift size h'(i, j) dependent on the position of the pixel i, j. The shift size h'(i, j) could be computed quickly using some bit operations on i and j, or it could be stored in a look up table. For a fast encryption, h should be chosen so that it can be performed quickly or, preferably, hard-wired into an encrypting hardware device, while maintaining the security of the cipher. One possible choice for h is $$h(i,j,g_{ij}) = g_{ij} \text{XOR}(i \text{XOR} j).$$

The result of enciphering the test image 10 (FIG. 1) using h'(i, j)=i.j is shown in FIGS. 3, 4, 5 and 6. FIG. 3 shows the enciphered image after one iteration. The result after 9 iterations is shown in FIG. 5. Even one iteration of the three-dimensional chaotic map makes the histogram 16 (FIG. 4) uniform, although the histogram 12 (FIG. 2) of the original image 10 (FIG. 1) was highly non uniform. Especially for images with a highly singular histogram, such as an image consisting of a black square, a simple permutation of pixels may not be safe enough. For such images, the use of three-dimensional chaotic maps is absolutely essential.

The method of the present invention has a robustness property in the sense that flipping one pixel in the encrypted image influences one pixel in the decrypted image. The error does not diffuse through the image. While this error robustness may be a desirable property for some applications, it may be potentially dangerous and decrease the security of the method under a chosen plain text type of attack. If an eavesdropper has access to the encryption machine and can choose the images to be encrypted, he could encrypt two images which differ in one pixel, and then compare the encrypted versions. This way, he can learn to which modified pixel is the original pixel mapped. Repeating this procedure for each pixel in the image could reveal the permutation of pixels. It is therefore possible to reconstruct the ciphering key. Consequently, finding an appropriate balance between error robustness and security with respect to a chosen cipher text type of attack is important. In order to do that, the three dimensional extension of the baker map is modified so that the gray value of the mapped pixel depends not only on the old gray value and on the pixel's position in the image, but also on neighboring pixels. The gray level permutation function will depend on gray levels of the neighboring pixel $g_{ij}$ $$h(i,j,g_{ij},g_{i-1j},g_{ij-1},g_{i+1j},g_{ij+1}).$$

This way, an error will diffuse to neighboring pixels each time the chaotic map is iterated. We have tested the following implementation of such function h. Here, we assume that the gray level $g_{ij}$ is the original gray level, and $ng_{ij}$ is the new gray level.

Code fraction 1

```
for(i = 0; i < M; i += 2)
{
    for(j = 0; j < N; j += 2)
    {
```

$$ng_{ij} = g_{i+1j} \text{XOR} g_{i+1j+1} \text{XOR} g_{ij+1}$$

$$ng_{i+1j} = g_{i+1j+1} \text{XOR} g_{ij+1} \text{XOR} g_{ij}$$

$$ng_{ij+1} = g_{i+1j+1} \text{XOR} g_{i+1j+1} \text{XOR} g_{ij}$$

$$ng_{i+1j+1} = g_{i+1j} \text{XOR} g_{ij+1} \text{XOR} g_{ij}$$

```
    }
}
```

By adjusting the number of iterations and the size of the neighborhood, we can specify the percentage of pixels influenced by one pixel in the course of iterations. In this way we can make the cipher secure with respect to chosen plain text type of attack, while partially keeping its robustness. One changed pixel will introduce some noise into the decrypted image, but the image will still be recognizable. While the noise can be to some extent corrected using image enhancement techniques, it is no longer computationally feasible to deduce the permutation of pixels.

The ciphering key is formed by the parameters of the chaotic map, the number of applications of the map, and the parameters of the gray level transformation h. The key $K_B$ is $$K_B = \{C, n_1, \ldots, n_k, p_1, \ldots, p_h\},$$

where C is the number of iterations of the baker map, $n_1, \ldots, n_k$ are the parameters of the baker map, and $p_1, \ldots, p_h$ are the parameters necessary to describe h. Experiments with real images and the cipher security analysis suggest that C<30 produces a safe encryption.

The number of possible keys grows very rapidly with the number of pixels in the image. Table 1 hereinbelow shows the number of all possible keys for various values of N where N is the number of pixels in one row.

TABLE 1

| N | K(N) | N | K(N) |
|---|------|---|------|
| 64 | $10^{15}$ | 512 | $10^{126}$ |
| 128 | $10^{15}$ | 1024 | $10^{255}$ |
| 256 | $10^{63}$ | 2048 | $10^{513}$ |

These estimates of the total number of different ciphering keys are based on the two-dimensional versions of the maps and do not take into account the three dimensional extension of the map. Adding the gray level mixing function further increases the total number of ciphering keys.

The portion of a ciphering key consisting of a sequence of integers which sum to the number of pixels in one row should be chosen randomly. This can be achieved by first randomly choosing the length of the key. Key lengths of between 10 and 40 have been shown to be effective and practical. It can be shown that the number of keys in this range is comparable to the total number of ciphering keys. The random sequence of integers is then easily generated by randomly inserting divisions between N elements, ignoring empty spaces.

The inventive encryption method may be used in three different modes depending on the character of the plain text and on the use of the chaotic map.

Figure 11:
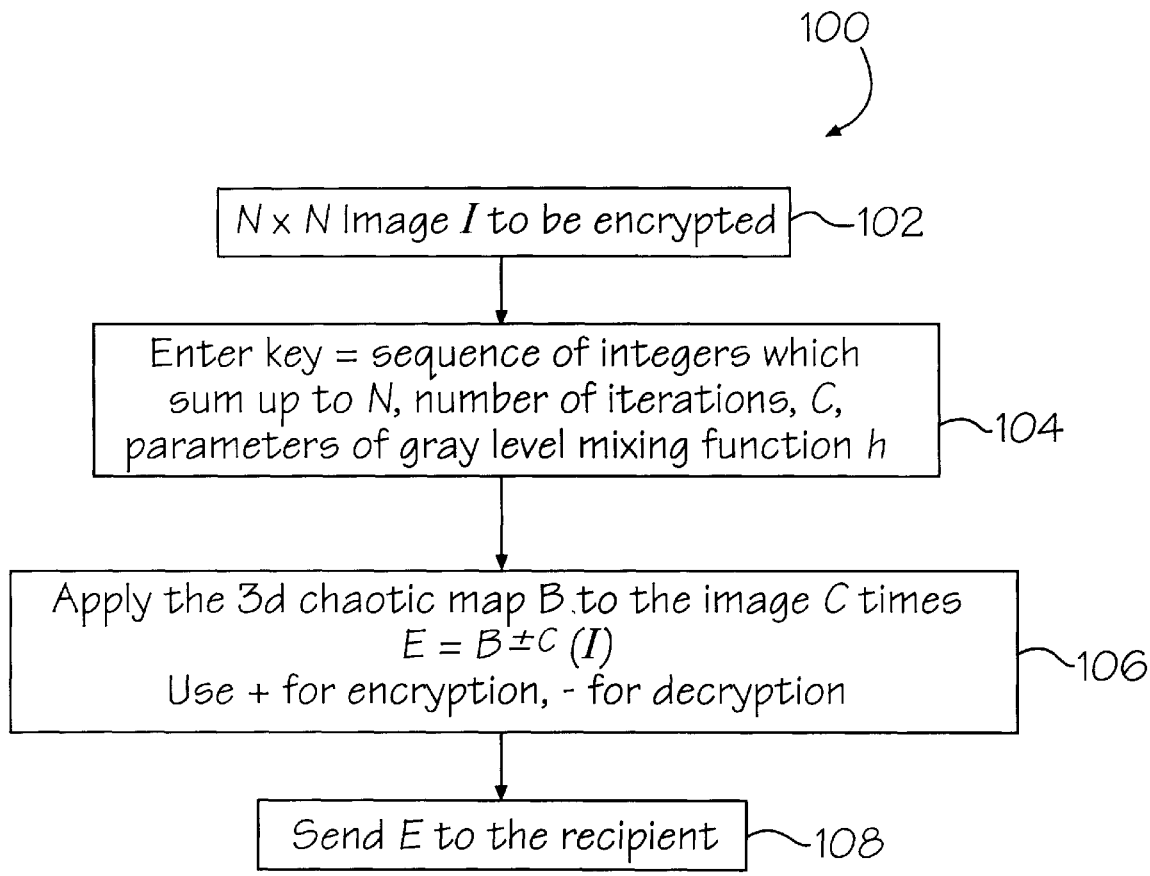
FIG. 11 is a flowchart showing a first mode of encryption/decryption of raw, uncompressed images.

Referring now to FIG. 11, a flow chart of a first mode, Mode 1 is generally shown at reference number 100. Mode 1 may be used in cases where the plain text to be encrypted is an uncompressed, raw rectangular image I. When this is the case, the inventive method may be directly applied to the raw data, step 102. A key consisting of a sequence of integers which sum to N; the number of iterations C; and parameters for a gray level mixing function h is entered, step 104. The enciphering phase consists of C applications of the three-dimensional chaotic map B, step . The resulting enciphered image E, to be transmitted, is obtained as $E=B^C (I)$, where B stands for the baker map extended to three dimensions as described hereinabove. Finally, the encrypted data E may be sent to the intended recipient or archived, step 108. The corresponding deciphering procedure is obtained simply by inverting the enciphering formula as $I=B^{-C} (E)$.

Figure 12:
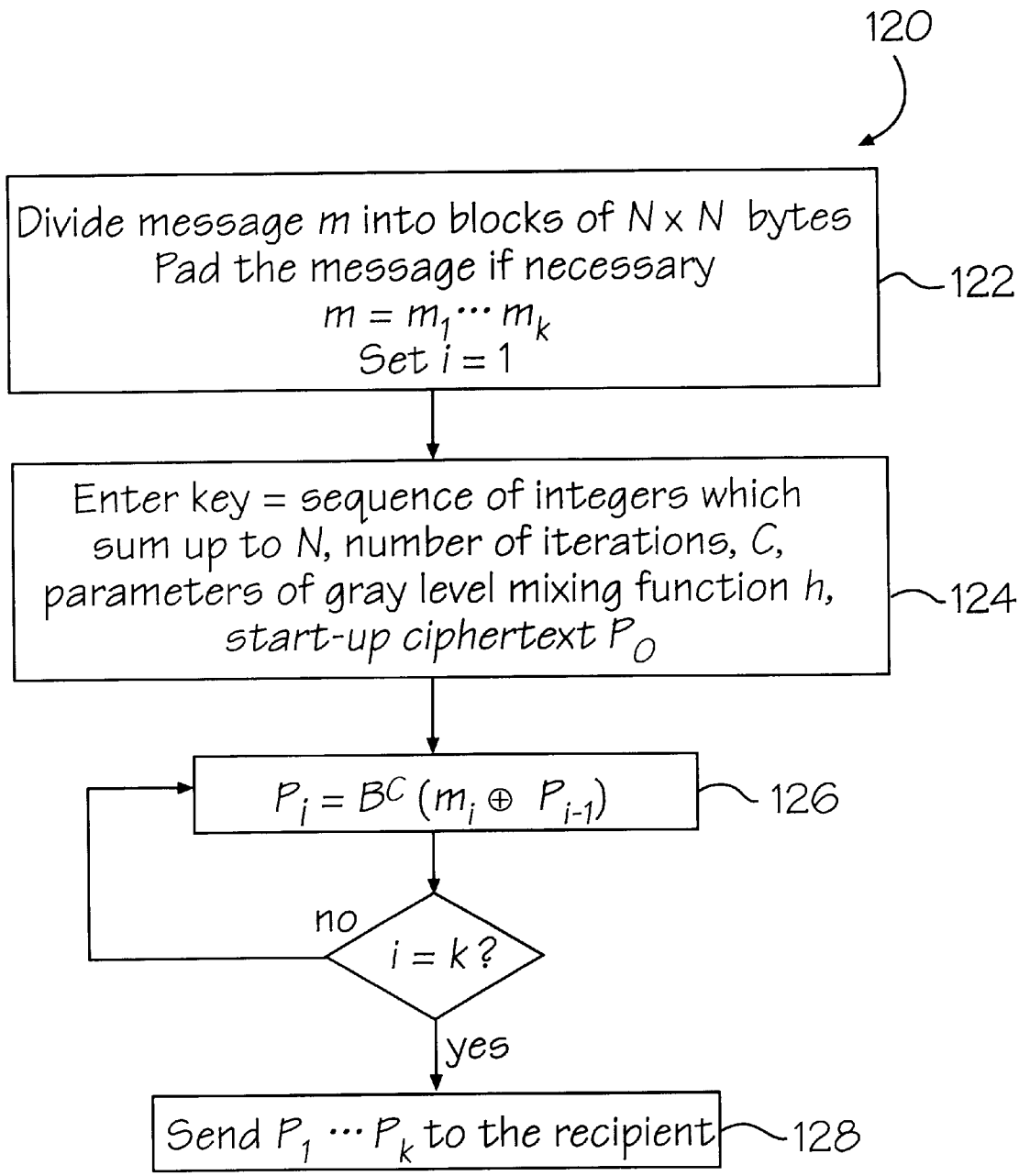
FIG. 12 is a flowchart showing the use of the encryption method as a block cipher with CBC chaining mode for a general message.

Referring now to FIG. 12, a flow chart illustrating the steps of a second mode, Mode 2 of the instant invention is shown generally at reference number 120. In Mode 2, the plain text may be an arbitrary binary file—a sequence of eight-bit symbols (bytes). In this case, the method of the present invention may be used as a block cipher with each block considered as one square image of size N×N. The plain text is first divided into blocks of N×N bytes (padding the text if necessary), step 122. A key consisting of a sequence of integers which sum to N; the number of iterations C; and parameters for a gray level mixing function h is entered, step 124. To achieve a secure encryption, block sizes should be chosen such that N>100. Each block is then considered as an N×N image with 256 gray levels. Each N×N block is enciphered separately. As with any block cipher, care must be taken so that two identical blocks are enciphered differently. Cipher Block Chaining (CBC) has been found satisfactory in meeting this requirement. The CBC mode is a general scheme applicable to ANY block cipher, and has been described in Brassard G., "Modern Cryptography", Springer-Verlag, New York 1988; The Data Encryption Standard is described in the technical report, "Data Encryption Standard", National Technical Information Service, National Bureau of Standards, Federal Information Processing Standards Publication, Springfield, Va. 1977 (FIPS PUB 46).

In this mode (mode 2), a message $m=m_1 m_2 \ldots m_k$ with each block $m_1$ of size N×N bytes is enciphered to the resultant cipher text $P=P_1 P_2 \ldots P_k$ using the recursive formula $P_1=B^C(m_i \oplus P_{i-1})$ where B denotes the three dimensional discretized baker map with gray level mixing, step 126. The operation $\oplus$ denotes the exclusive OR of two corresponding sets of eight-bit blocks (bytes). Enciphered text blocks $P_1 P_2 \ldots P_k$ may then be sent to a recipient, step 128.

Figure 13:
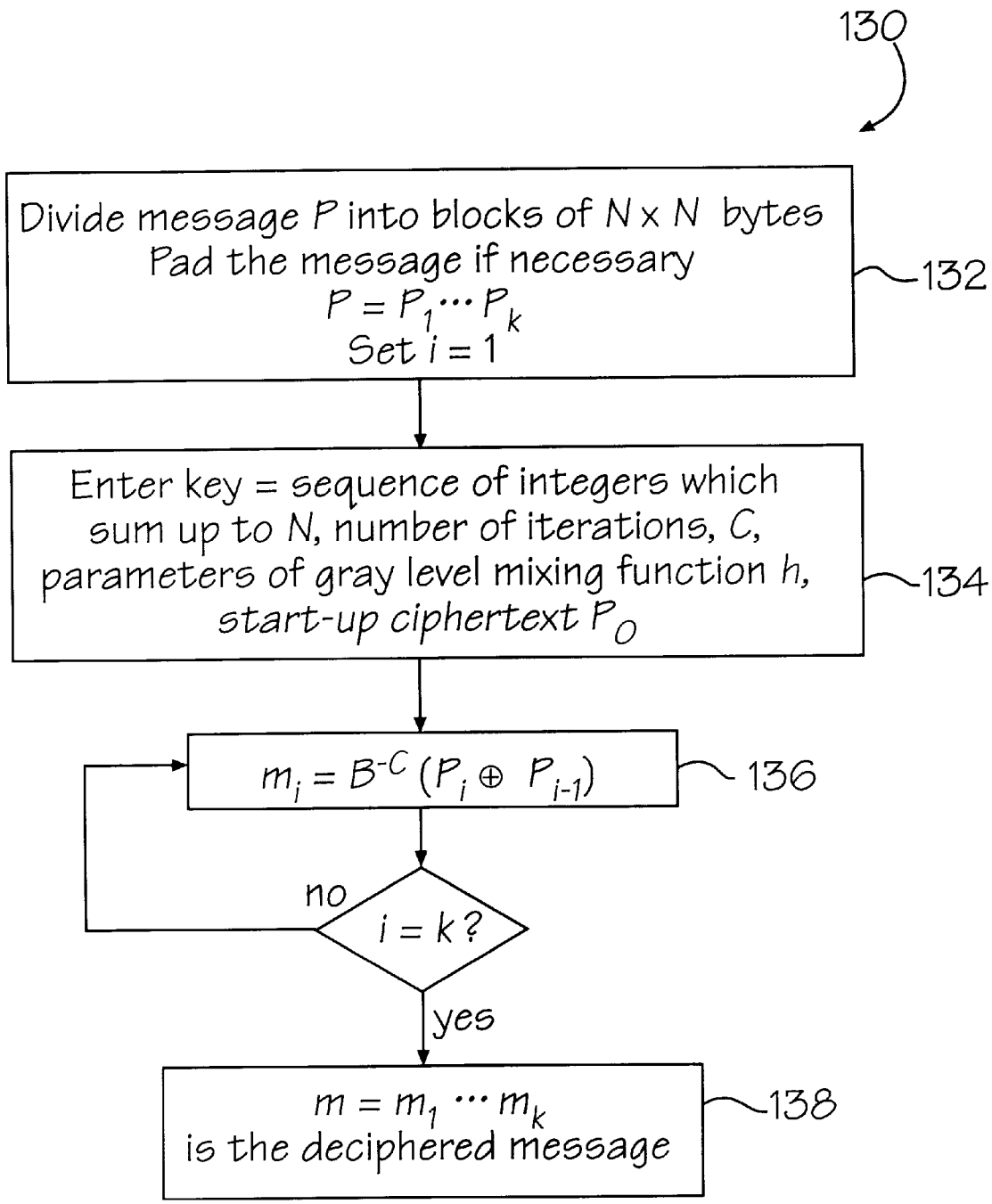
FIG. 13 is a flowchart showing the decryption method of the block cipher with CBC chaining mode for a general message.

This block chaining mode has the advantage that an error in the cipher text destroys at most two blocks of plain text in the deciphering process. Referring now to FIG. 13, a flow chart of the deciphering process corresponding to the enciphering process of FIG. 12 is shown at reference number 130. Enciphered message text P is first divided into blocks of N×N bytes. The enciphered message text is padded, if necessary, step 132. The proper key consisting of a sequence of integers which sum to N; the number of iterations C; parameters for a gray level mixing function h, and start-up ciphertext $P_0$ is entered, step 134. The formula $m_i=B^{-C}(P_i) \oplus P_{i-1}$ is iteratively applied to each block of message text $P=P_1 P_2 \ldots P_k$, step 136. Finally, the deciphered plain text message $m=m_1 m_2 \ldots m_k$ is made available to the recipient, step 138.

Figure 14:
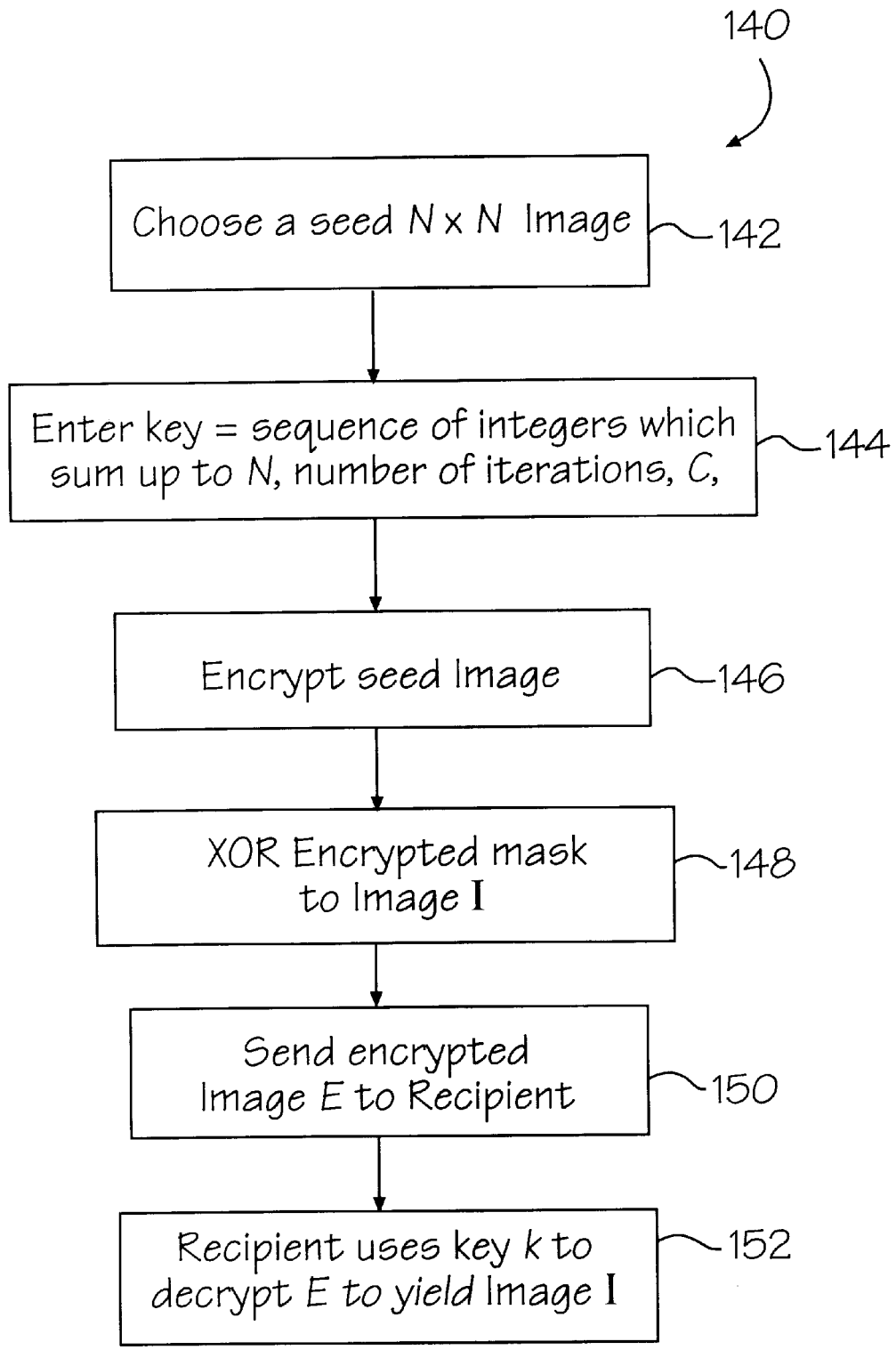
FIG. 14 is a flowchart showing the steps of a third mode of encryption wherein a random-looking encrypted image is used as a mask to encrypt an image of the same dimensions.

Referring now to FIG. 14, there is shown generally at reference number 140, a flow chart illustrating the steps of a third mode, Mode 3 of the present invention. In Mode 3 a random-looking encrypted image is used as a mask (one time pad) to encrypt an image of the same dimensions. By simply XOR-ing an image I with the random mask M, $I \oplus M$, a fast encryption method is obtained.

Starting with an N×N seed image S with L gray levels such as, for example, an image consisting of a solid black square, after performing C iterations, (for C>10) a random looking N×N mask is obtained. The sequence of pseudo random integers in the range [0, L-1] obtained by scanning the mask by rows has excellent randomness properties, a long period, and good cryptographic properties in the sense that it is computationally infeasible to calculate the key based on a finite sequence of random numbers.

First, an initial N×N seed image S with 256 gray levels is chosen, step 142. This seed image may be publicly known and reused for encrypting more than one image. Next, a ciphering key K consisting of a sequence of integers which add up to N, and the number of iterations C is chosen, step 144. The seed image is enciphered k times, 10<C<20, to obtain a random-looking mask $R=B^C(S)$, step 146. Image I is enciphered by overlaying mask R: $E=I \oplus R$, step 148. Encrypted image E is next sent to the recipient who knows the ciphering key K, step 150. The recipient then uses the secret key K to first generate the mask R and then subtracting it from E: $I=E-R$, step 152.

Figure 15:
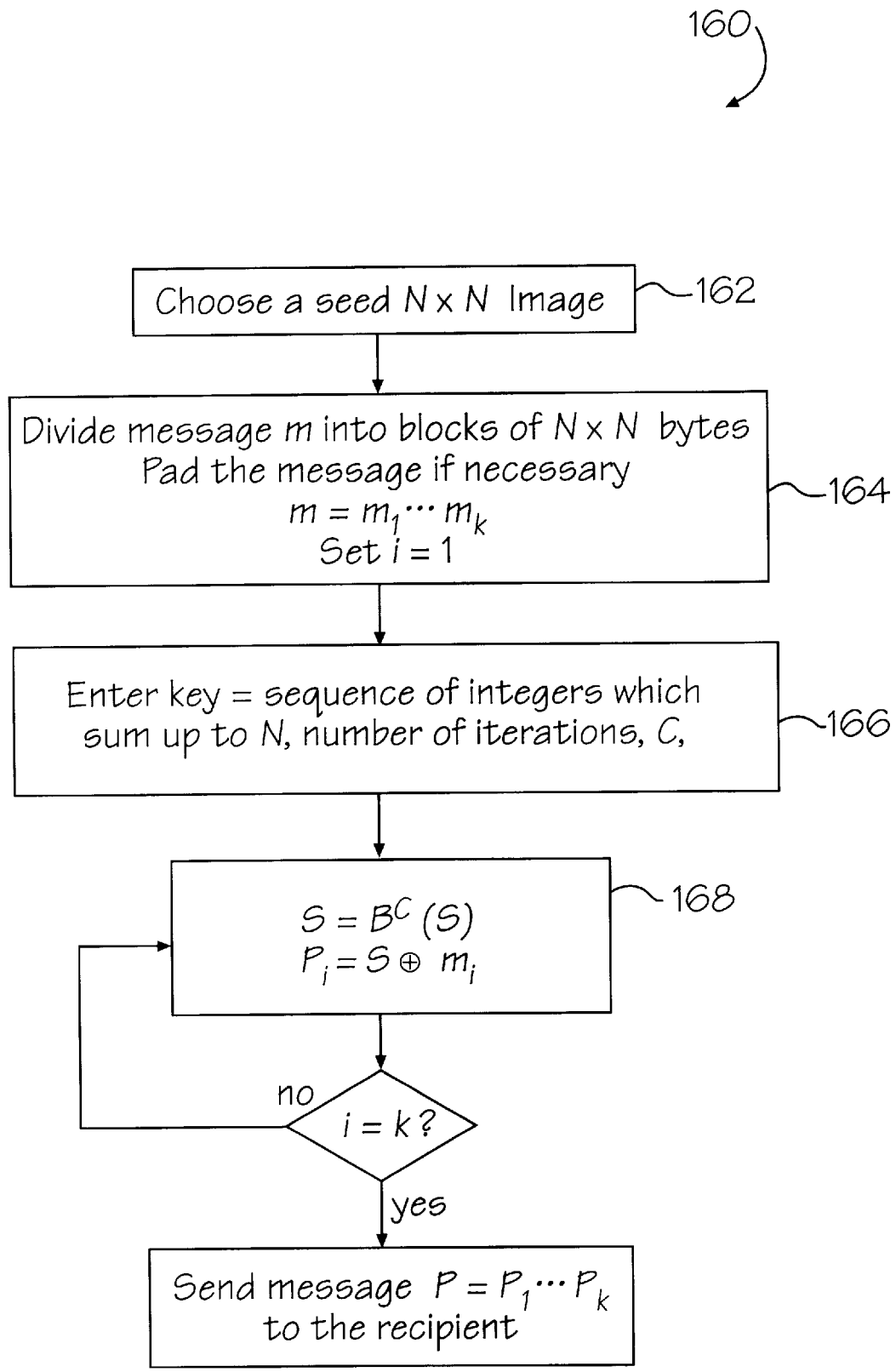
FIG. 15 is a flowchart showing the use of the encryption method as a one time pad masking with iterations of a fixed seed image.

In order to send more than one image or to send a message consisting of several blocks, the same mask cannot be used. To handle multiple images or images requiring several blocks for transmission, the enciphering/deciphering process must be modified. Referring now to FIG. 15, a flow chart illustrating the necessary modifications to the inventive method is shown generally at reference number 160. First, an initial N×N seed image S with 256 gray levels is chosen, step 162. A plain text message or image I ($m=m_1 m_2 \ldots m_k$) is divided into N×N blocks, padding message m as required, step 164. Next, a ciphering key K consisting of a sequence of integers which add up to N, and the number of iterations C is chosen, step 166. Each N×N block (i=1 to k) is enciphered with a one-time-pad generated by C applications of a chaotic map to the previous pad. In short, to encrypt k blocks, k pads are required, one pad for each block. The pad for the first block is $B^C(S)$, the pad for the second block is $B^{2C}(S)$, and the pad for the k-th block is $B^{kC}(S)$. Each N×N block $m_i$ is enciphered by overlaying mask S: $P_i=M_i \oplus S$, step 168. Finally, all encrypted blocks ($P_1 P_2 \ldots P_k$) are sent to a recipient who knows the ciphering key K, step 170. The recipient may then perform an inverse operation to recover the original image(s) or plain text message as described in detail hereinbelow.

Figure 16:
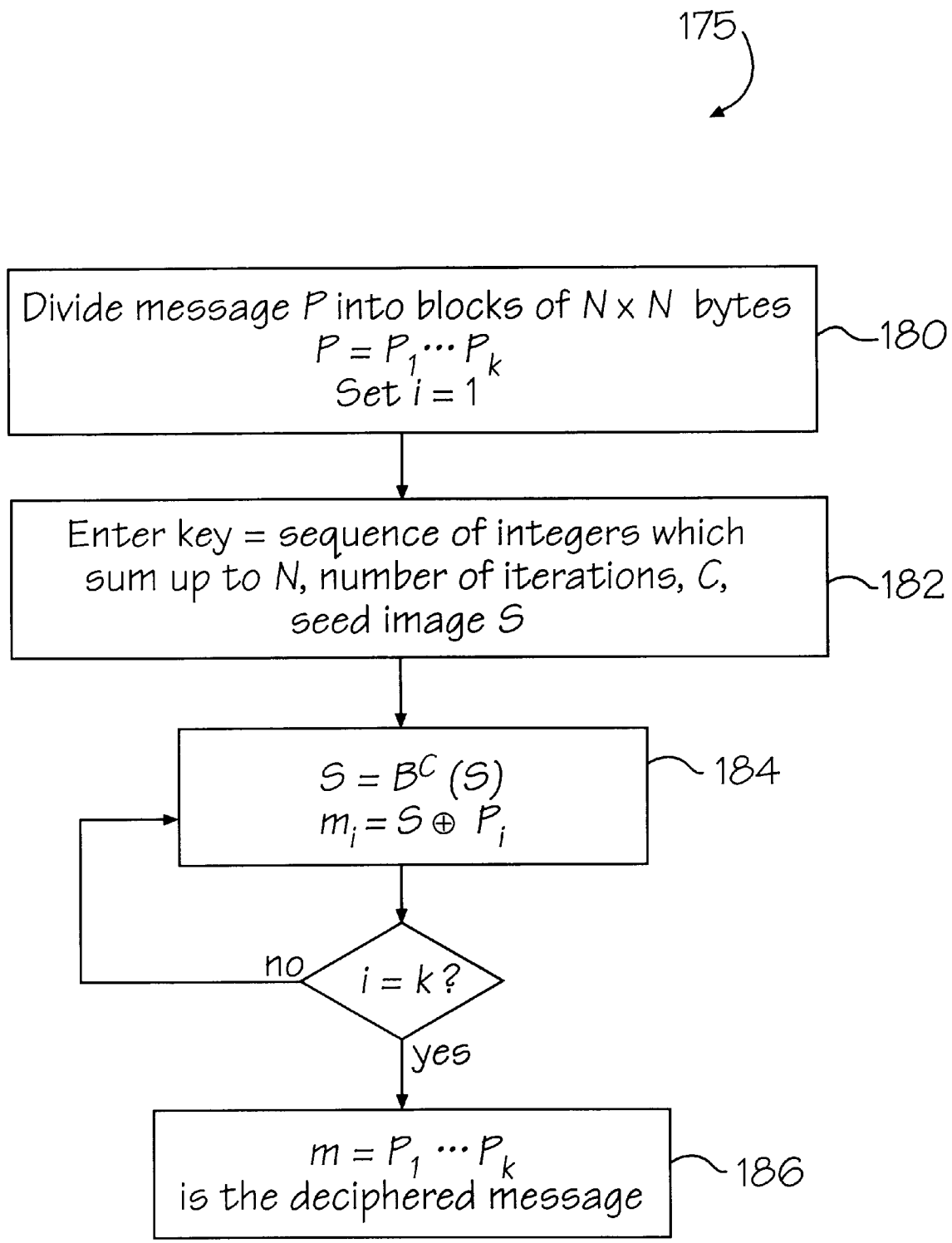
FIG. 16 is a flowchart showing the decryption method of the one time pad masking with iterations of a fixed seed image.

Referring now to FIG. 16, a flow chart illustrating the steps of that inverse operation is shown generally at reference number 180. Encrypted message P is first divided into N×N blocks $P_1 P_2 \ldots P_k$ step 182. The known key K, the number of iterations C and seed image S are next entered, step 182. For each of the k N×N blocks, the inverse operations $S=B^{-C}(S)$ and $m_i = S \oplus P_i$, are applied, step 184. After each block has been processed, the original plain text message m is fully recovered, step 186.

The use of a sequential computer for optimizing the ciphering keys will now be described. The generalized discretized baker map uses a short ciphering key consisting of a sequence of integers to identify a chaotic map which is later applied to a digital image. The chaotic transformation B maps a pixel with coordinates (r, s) to a new position (t1(r,s), t2(r,s)). The map B needs to be applied to each pixel of the original image C times, where C is typically between 10 and 20. The number of integer operations, such as addition, subtraction, division, or multiplication, is proportional to $CN^2$. The number of arithmetic operations can be made proportional to $N^2$ if the matrices t1(r,s), t2(r,s) are precalculated. Once these matrices are calculated, encrypting an image only requires assignment operations and operations associated with the gray level mixing function h. This is particularly useful for encrypting a sequence of images with the same key, such a sequence of digital video frames. The transfer matrices t1, t2 are square N×N matrices defined by the formula $$B_{(n_1, \ldots, n_k)}(r,s) = (t1(r,s), t2(r,s)).$$

The number of integer arithmetic operations needed to obtain the matrices is proportional to $N^2$. Once the transfer matrices have been determined, the enciphering process can be described using the following code fraction written in C. It is assumed that the gray levels of the original image are stored in a two-dimensional integer array a[0 ... N-1][0 ... N-1], and the new, enciphered image is stored in the integer array na [0 ... N-1] [0 ... N-1]. The variables i, jj, and aux are auxiliary integer variables.

```
for(i = 0; i < M; i ++)
{
    for(j = 0; j < N; j++)
    {
        ii = i; jj = j;
        for(k = 0; k < K; k++)
        {
            aux = t1[ii][jj];
            jj = t2[ii][jj];
            ii = aux;
            na[ii][jj] = h(i,j,a[i][j]);
        }
    }
}
```

The deciphering process can be implemented using transfer matrices in a similar way. In fact, having computed the transfer matrices t1 and t2, the inverse transfer matrices $t1^{-1}$ and $t2^{-1}$ can be obtained directly from t1, t2 without having to perform any integer arithmetic operations:

$$t1^{-1}(t1(r,s), t2(r,s)) = r$$

$$t2^{-1}(t1(r,s), t2(r,s)) = s.$$

A software package written in the C programming language for encryption/decryption purposes has been created. The package consists of the following functions:

encipher
decipher
compare
mask
unmask

A source code listing of these functions (encipher, decipher, compare, mask and unmask) is included with the instant patent application as Appendix A. It should be remembered that similar functions for practicing the instant invention could easily be written in other programming languages. These particular functions, written in the C programming language, are submitted for purposes of disclosure.

The use of these example functions on a UNIX-based computer system will now be illustrated. It should be obvious that these or similar functions could be executed on a variety of computer hardware operating any operating system without departing from the scope and spirit of the present invention.

An image I may be enciphered by performing the following steps:

1. Convert the image I to a pgm (Poskanzer's portable greyscale map) map. Assume that the name of the resultant file is image.pgm.
2. Create a *.key file, image.key containing the following information:

| | |
|---|---|
| TYPE OF CIPHERING (BAKER..B, CAT..C) | = B |
| GRAY LEVEL MIXING (YES..Y, NO..N) | = Y |
| KEY TYPE (RANDOM..R, CUSTOM..C) | = C |
| NUMBER OF ITERATIONS | = 10 |
| SEED | = 84 |
| KEY | = 59 59 60 58 59 59 59 |

Note: the format for the key file is required.

3. Encipher the image I using the command:
   encipher image.pgm Note: The encrypted image will be stored in the file c_image.pgm.
4. To decrypt the image, execute:
   decipher c_image.pgm. Note: The decrypted image is stored in the file image.pgm.

The entry of "C" for the key type requires that a ciphering key must then be specified on the fifth line. The key is a sequence of integers which add up to N—the number of pixels in one row. If an incorrect key is specified, an error message is displayed.

The computer may generate a random key if desired by entering "R" for the key type. The old key on the last line (if there is one) need not be erased. The new random key will replace the old one. The user is required to specify a random seed for the random number generator.

By entering "Y" for the gray level mixing, the encrypted image will have a uniform histogram. It is suggested that this feature always be used; otherwise the histogram of the image may be used by an eavesdropper to learn information about the encrypted image.

The number of iterations should be at least 5 for safe encryption. Number of iterations greater than 30 are not recommended because it slows down the encryption process and no real improvement in security is attained.

The function compare compares two image files, image1.pgm and image2.pgm and counts the relative fraction of pixels by which image1 and image2 differ. To execute compare, type:

compare image1.pgm image2.pgm

The result is a percentage of different non matching pixels. It should be noted that images of different sizes can not be compared. If the dimensions of image1 and image2 do not agree, an error message is issued.

The program mask masks a file image1.pgm with a random mask image2.pgm. Any encrypted image may be used. The encrypted image utilized, however, should have a uniform histogram before using it as a mask. Using a mask with a non-uniform histogram may result in an unsafe cipher.

The syntax for the use of the mask and unmask functions in the UNIX environment is now presented.

To mask a first image in file image1.pgm with a second image located in file image2.pgm, type:

mask image1.pgm image2.pgm

The newly-created masked file is stored in m_image1.pgm.

To unmask m_image1.pgm, type:

unmask m_image1.pgm image2.pgm.

The unmasked file is stored in image1.pgm.

The source code files disclosed may be compiled into executable form using and standard C compiler. The inventor used a CC compiler.

The disclosed functions may also be run in the PC environment. Source code compiled for protected mode execution runs satisfactorily on a '386 or higher processor. In the PC environment, a different format for graphical image is used. The inventor chose the SUN raster format (.ras) files (SUN Raster Data Format developed by Sun Microsystems of Mountain View, Calif.) as defined for use with SUN Microsystems, Inc. equipment. The inventor found that the Paintshop Pro program was useful for viewing images in the SUN .ras format, but any standard commercial viewing software can be used. The use of the functions described hereinabove is the same in the PC environment as in the UNIX environment.

Since other modifications and changes varied to fit particular operating requirements and environments will be apparat to those skilled in the art, the invention is not considered limited to the example chosen for purposes of disclosure, and covers all changes and modifications which do not constitute departure from the true spirit and scope of the invention.

Having this described the invention, what is desired to be protected by Letters Patents is presented in the subsequent appended claims.

What is claimed is:

1. A method for encrypting data, the steps comprising:

a) creating a discretized map, the sub-steps comprising:
   i) providing an array of data, said data comprising elements arranged in a first M×N array, each element having a value;
   ii) generating a key that is representative of at least one of said dimensions M and N of said array of data, said key having at least one numeric value;
   iii) building a two-dimensional chaotic map using said key by substituting for at least one of said elements of said first M×N array a new value dependent upon the position of said element in said first M×N array, the original value of said element, and the value of at least one other element;
   iv) extending said two-dimensional chaotic map into at least a third dimension; and b) applying said discretized map to a second M×N array of data to generate encrypted data representative thereof.

2. The method for encrypting data as recited in claim 1, wherein said at least one other element is an element adjacent one of said elements of said first M×N array.

3. The method for encrypting data as recited in claim 1, wherein said two-dimensional chaotic map is a baker map.

4. A method for encrypting data, the steps comprising:

a) creating a discretized map, the sub-steps comprising:
   i) providing an array of data, said data comprising elements arranged in a first M×N array comprising a discretized image, each element having a value;
   ii) generating a key representative of at least one of said dimensions M and N of said first array of data, said key having at least one numeric value;
   iii) building a two-dimensional chaotic baker map using said key;
   iv) extending said chaotic map into at least a third dimension;

b) applying said discretized map successively to subsequent M×N arrays of data, at least one of said subsequent arrays of data being padded with dummy data, said subsequent M×N arrays being formed from larger arrays of data, to generate encrypted data representative of each of said arrays.

* * * * *